(12) United States Patent
Tsukamoto et al.

(10) Patent No.: US 10,849,190 B2
(45) Date of Patent: Nov. 24, 2020

(54) TERMINAL DEVICE, COMMUNICATION METHOD, AND RECORDING MEDIUM FOR PERFORMING COMMUNICATION WITH BASE STATION DEVICE

(71) Applicant: JVCKENWOOD Corporation, Yokohama-shi, Kanagawa (JP)

(72) Inventors: Kazuya Tsukamoto, Yokohama (JP); Tomohiro Azami, Yokohama (JP); Takashi Kawada, Yokohama (JP); Masae Toko, Yokohama (JP); Wataru Shirai, Yokohama (JP); Ryo Miyakuchi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 16/547,672

(22) Filed: Aug. 22, 2019

(65) Prior Publication Data

US 2020/0068657 A1 Feb. 27, 2020

(30) Foreign Application Priority Data

Aug. 23, 2018 (JP) .................................. 2018-156639

(51) Int. Cl.
*H04W 4/02* (2018.01)
*H04W 88/02* (2009.01)
*H04W 92/18* (2009.01)

(52) U.S. Cl.
CPC .............. *H04W 88/02* (2013.01); *H04W 4/02* (2013.01); *H04W 92/18* (2013.01)

(58) Field of Classification Search
CPC ........ H04W 88/02; H04W 4/02; H04W 92/18

USPC ......................................................... 455/525
See application file for complete search history.

(56) References Cited

U.S. PATENT DOCUMENTS

| | | | | |
|---|---|---|---|---|
| 6,906,996 B2* | 6/2005 | Ballantyne | ............ | H04L 1/0003 370/204 |
| 7,495,608 B1* | 2/2009 | Chen | ...................... | G01S 19/06 342/357.43 |
| 7,693,093 B2* | 4/2010 | Riedel | .................. | H04W 36/26 370/260 |
| 8,355,751 B2* | 1/2013 | Dietz | ................ | H04W 52/0254 455/556.1 |
| 8,737,987 B1* | 5/2014 | Pulugurta | ............. | H04W 48/16 455/432.1 |
| 8,848,654 B2* | 9/2014 | He | ........................ | H04W 16/32 370/331 |

(Continued)

FOREIGN PATENT DOCUMENTS

JP 2008244942 A 10/2008

*Primary Examiner* — Hai V Nguyen
(74) *Attorney, Agent, or Firm* — Brundidge & Stanger, P.C.

(57) ABSTRACT

A first communication interface communicates with one of a plurality of base station devices according to a first communication scheme. A second communication interface communicates with a further terminal device according to a second communication scheme different from the first communication scheme. A controller selects a base station device that the first communication interface should communicate with based on base station information received in the second communication interface from the further terminal device and related to the base station device that the further terminal device is communicating with.

10 Claims, 9 Drawing Sheets

(56) References Cited

U.S. PATENT DOCUMENTS

| | | | | |
|---|---|---|---|---|
| 9,137,771 | B2* | 9/2015 | Wrappe | G01S 5/0036 |
| 9,826,360 | B2* | 11/2017 | Hibara | H04L 12/6418 |
| 9,992,714 | B1* | 6/2018 | Singh | H04W 36/0083 |
| 10,139,482 | B2* | 11/2018 | Matsumoto | H04W 64/00 |
| 10,349,488 | B2* | 7/2019 | Black | G02B 26/0883 |
| 10,382,986 | B2* | 8/2019 | Brisebois | H04W 28/0236 |
| 10,609,565 | B2* | 3/2020 | Taori | H04W 16/10 |
| 2002/0028655 | A1* | 3/2002 | Rosener | H04W 16/26 455/16 |
| 2003/0007470 | A1* | 1/2003 | Grilli | H04W 56/002 370/335 |
| 2003/0216126 | A1* | 11/2003 | Ballantyne | H04L 27/0008 455/102 |
| 2004/0121784 | A1* | 6/2004 | Park | H04W 64/00 455/456.1 |
| 2008/0159226 | A1* | 7/2008 | He | H04W 16/32 370/331 |
| 2010/0109864 | A1* | 5/2010 | Haartsen | G01S 5/0236 340/539.13 |
| 2012/0225680 | A1* | 9/2012 | Suh | H04W 16/32 455/501 |
| 2012/0263059 | A1* | 10/2012 | Kim | H04W 36/0088 370/252 |
| 2013/0095882 | A1* | 4/2013 | Saito | H04W 88/06 455/552.1 |
| 2018/0192943 | A1* | 7/2018 | Annoni | A61N 1/0534 |
| 2018/0270677 | A1* | 9/2018 | Brisebois | H04W 24/08 |
| 2018/0342032 | A1* | 11/2018 | Daigle | G06Q 10/06395 |
| 2020/0059821 | A1* | 2/2020 | Wirth | H04L 1/1819 |
| 2020/0092685 | A1* | 3/2020 | Fehrenbach | H04B 7/15507 |

* cited by examiner

| BASE STATION ID | CH INFORMATION | INTENSITY OF RECEIVED SIGNAL |

| CONDITION | FIRST POINT |
|---|---|
| A1 OR MORE | 5 |
| A2 OR MORE | 4 |
| A3 OR MORE | 3 |
| A4 OR MORE | 2 |
| LESS THAN A4 | 1 |

FIG.9B

| CONDITION | SECOND POINT |
|---|---|
| B1 OR MORE | 5 |
| B2 OR MORE | 4 |
| B3 OR MORE | 3 |
| B4 OR MORE | 2 |
| LESS THAN B4 | 1 |

26

TERMINAL DEVICE, COMMUNICATION METHOD, AND RECORDING MEDIUM FOR PERFORMING COMMUNICATION WITH BASE STATION DEVICE

CROSS-REFERENCE TO RELATED APPLICATION

This application is based upon and claims the benefit of priority from the prior Japanese Patent Application No. 2018-156639, filed on Aug. 23, 2018, the entire contents of which is incorporated herein by reference.

BACKGROUND OF THE INVENTION

1. Field

The present invention relates to communication technology and, more particularly, to a terminal device, a communication method, and a recording medium for performing communication with a base station device.

2. Description of the Related Art

A terminal device communicates with another terminal device via a base station device. When a terminal device is located outside a coverage that cannot be reached by a signal from a base station device, the terminal device will not be able to communicate. In a technology to guide a user of a terminal device located outside a coverage to move inside the coverage, each terminal device acquires position information and the intensity of a signal received from the base station device and exchanges these items of information with other terminal devices around by near field communication. The terminal device displays these items of information received from other terminal devices on a map and prompts the user of the terminal device to move inside the coverage of the base station device (see, for example, patent document 1).
[Patent Literature 1] JP2008-244942

In locations like indoor places where the condition of reception becomes poor locally, signals from a base station device that do not arrive temporarily may arrive with the elapse of time due to a variation in the environment for radio communication. Therefore, the user may stay where he or she is. Unlike locations like indoor places where the condition of reception becomes poor locally, a terminal device outside the coverage should search for a new base station device and communicate with the new base station device. However, a terminal device cannot discriminate whether the terminal device is in a location like indoor places where the condition of reception becomes poor locally or is outside the coverage. Therefore, the terminal device searches for a new base station device once the terminal device cannot receive signals. In a search like this, the terminal device attempts to receive a control signal transmitted from the new base station device so that communication is disabled during the search. It is therefore preferred to inhibit an unnecessary search for a base station device.

SUMMARY OF THE INVENTION

A terminal device according to an embodiment includes: a first communication interface that communicates with one of a plurality of base station devices according to a first communication scheme; a second communication interface that communicates with a further terminal device according to a second communication scheme different from the first communication scheme; and a controller that selects a base station device that the first communication interface should communicate with based on base station information received in the second communication interface from the further terminal device and related to the base station device that the further terminal device is communicating with.

Another embodiment relates to a communication method. The method includes: communicating with one of a plurality of base station devices according to a first communication scheme; communicating with a further terminal device according to a second communication scheme different from the first communication scheme; and selecting a base station device to communicate with according to the first communication scheme, based on base station information received from the further terminal device according to the second communication scheme and related to the base station device that the further terminal device is communicating with.

Optional combinations of the aforementioned constituting elements, and implementations of the embodiments in the form of methods, apparatuses, systems, recording mediums, and computer programs may also be practiced as additional modes of the embodiments.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE PREFERRED EMBODIMENT

The invention will now be described by reference to the preferred embodiments. This does not intend to limit the scope of the present invention, but to exemplify the invention.

Embodiment 1

A summary of the prevent invention will be given before describing the invention in specific detail. An embodiment of the present invention relates to a communication system in which a terminal device is connected to one of a plurality of base station devices. The communication system is exemplified by a business wireless system. When a terminal device leaves a coverage where a control signal from the currently connected base station device can be received, the terminal device switches its connection to a further base station device from which a control signal can be received in order to continue communication. In this roaming, the terminal device measures the electric field intensity over a pre-registered frequency band and selects a base station device as a new destination of connection for which proper communication quality can be secured. The operation is referred to as a scan or a search. Generally, the electric field intensity of frequency channels of a plurality of pre-registered base station devices is measured successively.

In a search to determine a base station device to switch to by roaming, the electric field intensity is measured continuously over a predefined period of time in order to determine whether a favorable communication quality is secured with the base station device. The predefined period of time is necessary to determine whether the communication quality remains stable continuously. Communication is disabled during this period. The search is started on the condition that the intensity of the control signal that the terminal device receives from the base station device drops below a threshold value. This is because the terminal device is considered to have moved outside the coverage of the base station device under such a condition. However, a drop in the intensity of a received signal occurs not only when the terminal device has moved from the coverage of the currently connected base station device to the coverage of a further base station device but also when the intensity is affected by an obstacle (e.g., inside a building). In the latter case, a search would not result in identification of a further base station device but only results in a period of time of disabled communication wastefully created due to the search. In such a case, it is preferred to continue communication with the currently connected base station device without performing a search.

Generally, however, a period of time of disabled communication is increased when a search for a control signal is started. For this reason, inhibition of an unnecessary search for a base station device is called for. In this embodiment, the terminal device uses proximity communication to receive, from a further terminal device, base station information related to the base station device that the further terminal device is communicating with, when the intensity of a control signal received from the base station device that the terminal device is communicating with drops below a threshold value. When the base station device that the further terminal device is communicating with differs from the base station device that the terminal device is communicating with, the terminal device starts a search for a new base station device. This is relevant to a case where the terminal device has moved outside the coverage. When the base station device that the further terminal device is communicating with is identical to the base station device that the terminal device is communicating with, on the other hand, the terminal device does not start a search for a new base station device and maintains communication with the base station device that the terminal device is currently communicating with. This is relevant to a case where the condition of reception has become poor locally.

Figure 1:
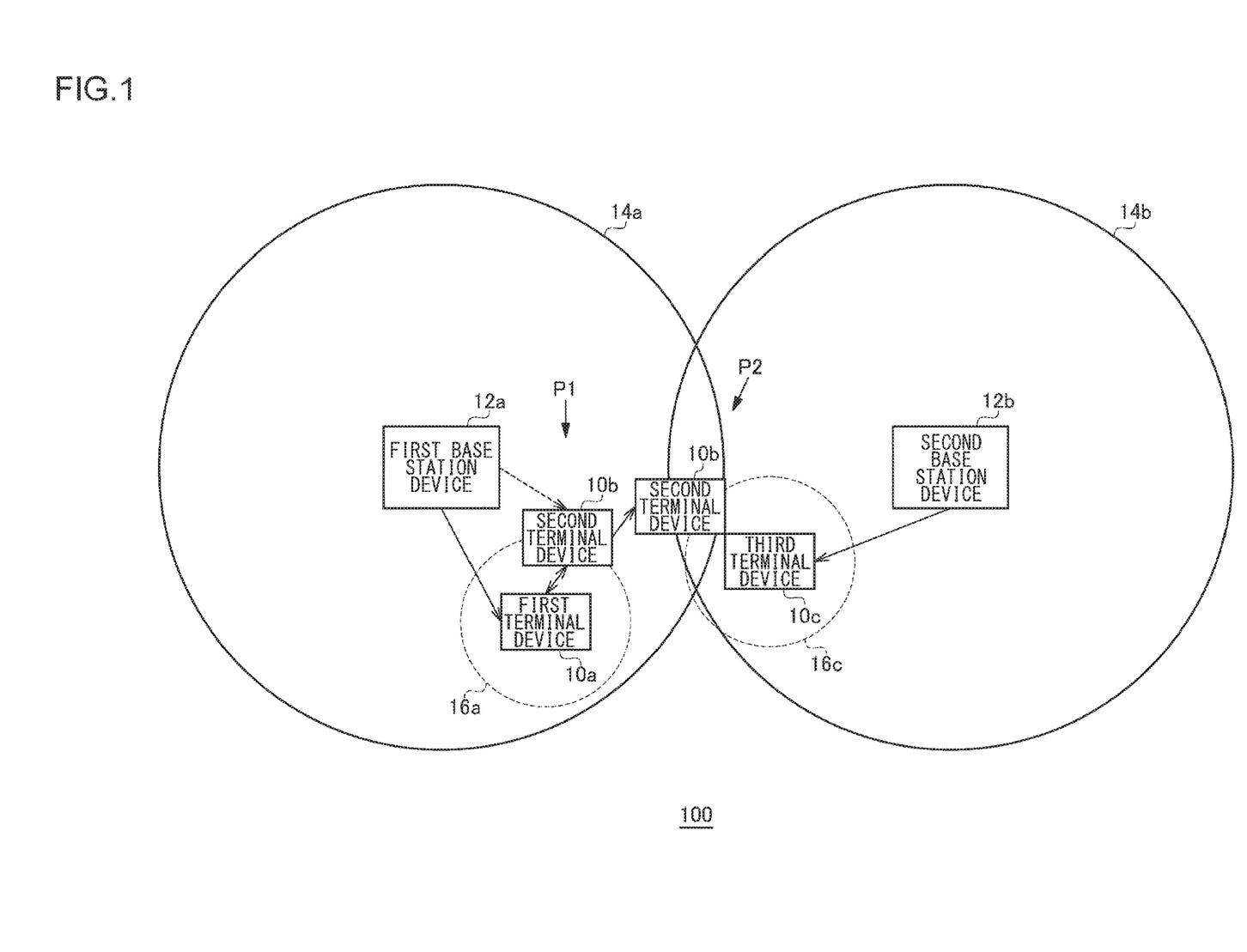
FIG. 1 shows a configuration of a communication system according to embodiment 1.

FIG. 1 shows a configuration of a communication system 100. The communication system 100 includes a first terminal device 10a, a second terminal device 10b, and a third terminal device 10c, which are generically referred to as terminal devices 10, a first base station device 12a, and a second base station device 12b, which are generically referred to as base station devices 12. The number of terminal devices 10 is not limited to "3", and the number of base station devices 12 is not limited to "2". The first base station device 12a forms a first wide communication area 14a. The first wide communication area 14a is an area where signals from the first base station device 12a can be received and corresponds to the coverage mentioned above. The second base station device 12b similarly forms a second wide communication area 14b. The first wide communication area 14a and the second wide communication area 14b are generically referred to as wide communication areas 14.

The first terminal device 10a is located in the first wide communication area 14a. In other words, the first terminal device 10a is capable of communicating with the first base station device 12a by receiving a control signal from the first base station device 12a. Communication in the wide communication area 14 is exemplified by a business wireless system. The first terminal device 10a is compatible with Push-To-Talk (PTT) and transmits a call signal including a speech signal to the first base station device 12a as the PTT button is pressed down. The call signal transmitted to the first base station device 12a is received by the terminal device(s) 10 other than the first terminal device 10a. Meanwhile, during a period of time in which the PTT button is not pressed down, the first terminal device 10a receives a call signal from the first base station device 12a transmitted from the terminal device 10 other than the first terminal device 10a. The first terminal device 10a plays back the speech signal included in the call signal. The former is relevant to a case where the device is used by a caller, and the latter is relevant to a case where the device is used by a receiver.

The third terminal device 10c is located in the second wide communication area 14b. In other words, the third terminal device 10c is capable of communicating with the second base station device 12b by receiving a call signal from the second base station device 12b. The configuration of the third terminal device 10c is similar to that of the first terminal device 10a, and a description thereof is omitted. The second terminal device 10b moves from point P1 in the first wide communication area 14a to point P2 near the border between the first wide communication area 14a and the second wide communication area 14b. The configuration of the second terminal device 10b is similar to that of the first terminal device 10a, and a description thereof is omitted.

The first terminal device 10a forms a first narrow communication area 16a. The first narrow communication area 16a is an area where proximity communication signals from the first terminal device 10a can be received. Proximity communication is exemplified by Bluetooth (registered trademark). Hereinafter, when the business wireless system is referred to as "first communication scheme", Bluetooth may be referred to as "second communication scheme". The first communication scheme is not limited to a business wireless system, and the second communication scheme is not limited to Bluetooth. It is only necessary that the range in which communication according to the second communication scheme is enabled be shorter than the range in which communication according to the first communication scheme is enabled. The third terminal device 10c forms a third narrow communication area 16c, and the first narrow communication area 16a and the third narrow communication area 16c are generically referred to as narrow communication areas 16. The second terminal device 10b also forms a second narrow communication area 16b, but the illustration of the second narrow communication area 16b is omitted.

Figure 2:
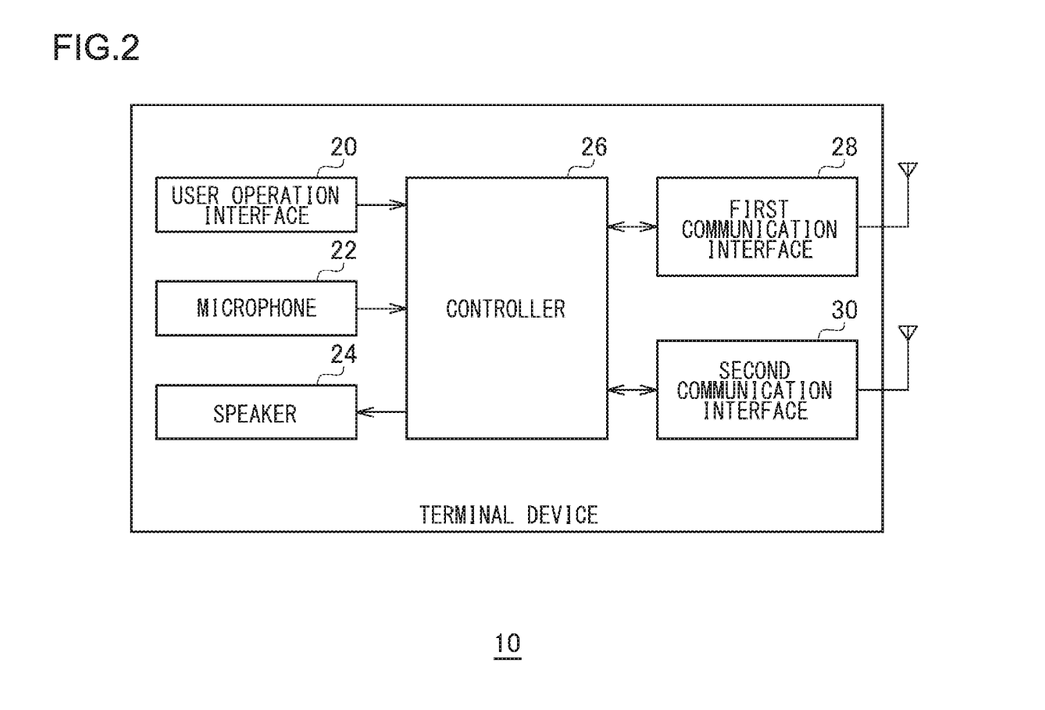
FIG. 2 shows a configuration of the terminal device of FIG. 1.

Hereinafter, a description will be given of the configuration of the terminal device 10 with reference to FIG. 2 on the assumption that the terminal devices 10 and the base station devices 12 are arranged as shown in FIG. 1. FIG. 2 shows a configuration of the terminal device 10. The terminal device 10 includes a user operation interface 20, a microphone 22, a speaker 24, a controller 26, a first communication interface 28, and a second communication interface 30. A description of (1) a basic operation will be given first, (2) followed by a description of the first process in the search for the base station device 12. A description will then be given of (3) the second process in the search for the base station device 12, (4) the third process in the search for the base station device 12.

(1) Basic Operation

The first communication interface 28 communicates with one of the plurality of base station devices 12 according to the first communication scheme such as a business wireless system. A plurality of frequency channels are defined in the first communication scheme. Each base station device 12 selects one of the plurality of frequency channels and transmits a control signal in the selected frequency channel. The control signal includes, for example, identification information (hereinafter, referred to as "base station ID") for identifying the base station device 12 transmitting the control signal. The control signal may include information related to the base station device 12 other than the base station ID. The first communication interface 28 is connected to each base station device 12 and is enabled to communicate with the base station device 12 by receiving the control signal. A publicly known technology defined in a business wireless system, etc. may be used for these processes.

The user operation interface 20 is exemplified by a PTT button, which is pressed down to transmit a call signal when the terminal device 10 is used by a caller. Meanwhile, a call signal is not transmitted when the terminal device 10 is used by a receiver. In this case, the user operation interface 20 is not pressed down. The controller 26 is connected to the user operation interface 20 and detects that the user operation interface 20 is pressed down. The controller 26 controls the process in the terminal device 10 based on a result of detection. The microphone 22 receives a speech originated by the caller when the controller 26 detects that the user operation interface 20 is pressed down. The microphone 22 converts the speech into an electrical signal and outputs the speech in the electrical signal (hereinafter, also referred to as "speech") to the controller 26. The controller 26 receives the speech from the microphone 22. The controller 26 generates a speech signal by subjecting the speech to a process such as encoding.

The first communication interface 28 generates a call signal including the speech signal generated by the controller 26. The call signal includes the ID of the terminal device 10 originating the call signal and the ID of the terminal device 10 to which the call signal is destined. In the case of group communication, the ID of a group to which the call signal is destined may be included instead of the ID of the terminal device 10 to which the call signal is destined. When communication with the base station device 12 is enabled, the first communication interface 28 transmits the call signal to the base station device 12.

When the controller 26 does not detect that the user operation interface 20 is pressed down, the first communication interface 28 receives a call signal from the base station device 12. The call signal is transmitted from the further terminal device 10. The first communication interface 28 extracts a speech signal from the call signal and extracts the ID of the destination terminal device 10. When the extracted ID is the ID of the host device, the first communication interface 28 outputs the speech signal to the controller 26. The controller 26 acquires the speech by subjecting the speech signal to a process such as decoding. The controller 26 plays back the speech and outputs the speech to the speaker 24. The speaker 24 outputs the speech outside.

(2) The First Process in the Search for the Base Station Device 12

When the control signal from the base station device 12 is received, the first communication interface 28 outputs the base station ID included in the control signal to the controller 26 and outputs the information on the frequency channel in which the control signal is received (hereinafter, referred to as "CH information") to the controller 26. Further, the first communication interface 28 measures the intensity of the received control signal and outputs information on the intensity of the received control signal as measured to the controller 26. A publicly known technology may be used to measure the intensity of the received control signal so that a description thereof is omitted.

Figure 3:
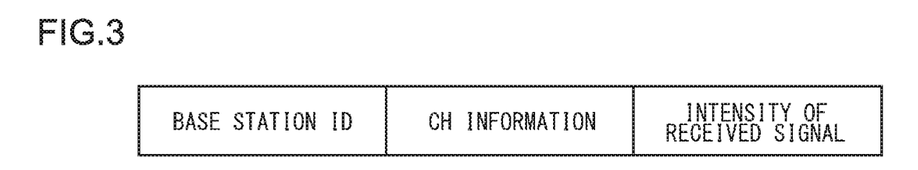
FIG. 3 shows a format of a signal used in the second communication interface of FIG. 2.

The second communication interface 30 communicates with the further terminal device 10 according to the second communication scheme such as Bluetooth. For example, the second communication interface 30 receives, from the controller 26, the base station ID, the CH information, and the information on the intensity of the received control signal. The second communication interface 30 generates information that includes these items of information (hereinafter, referred to as "base station information"). The base station information represents information related to the base station device 12 that the terminal device 10 is communicating with. FIG. 3 shows a format of a signal used in the second communication interface 30. The content of the signal includes, but is not limited to, the base station ID, the CH information, and the information on the intensity of the received control signal. Reference is made back to FIG. 2.

The second communication interface 30 of the first terminal device 10a of FIG. 1 includes, in the base station information, the base station ID of the first base station device 12a, the CH information on the frequency channel used in the first base station device 12a, and the information on the intensity of the control signal received from the first base station device 12a. The second communication interface 30 transmits the resultant base station information. The base station information is transmitted by Bluetooth LE broadcasting. The base station information can be received in the first narrow communication area 16a. The second communication interface 30 of the third terminal device 10c includes, in the base station information, the base station ID of the second base station device 12b, the CH information on the frequency channel used in the second base station device 12b, and the information on the strength of the control signal received from the second base station device 12b. The second communication interface 30 transmits the resultant base station information. The base station information can be received in a third narrow communication area 16c. For example, the base station information is transmitted periodically.

For example, the second communication interface 30 of the second terminal device 10b of FIG. 1 receives the base station information from the first terminal device 10a when the second terminal device 10b enters the first narrow communication area 16a. This is equivalent to receiving the base station information from the further terminal device 10 related to the base station device 12 that the further terminal device 10 is communicating with. When the second terminal device 10b is transmitting the base station information and the first terminal device 10a enters the second narrow communication area 16b (not shown) of the second terminal device 10b, the first terminal device 10a can receive the base station information from the second terminal device 10b.

Given the configuration described above, it is assumed that the second terminal device 10b is located at point P1 of FIG. 1. Point P1 is a site where the intensity of the control signal received from the first base station device 12a is locally lowered regardless of the fact that the second terminal device 10b is within the first wide communication area 14a and the first narrow communication area 16a. In other words, point P1 is a localized blind zone. The controller 26 of the second terminal device 10b receives the information on the intensity of the received control signal from the first communication interface 28. When the intensity received is equal to lower than a threshold value, the controller 26 recognizes that reception of the control signal is difficult. When the terminal device 10 according to the related art recognizes that reception of the control signal is difficult, the terminal device 10 estimates that the terminal device 10 has moved outside the wide communication area 14 and searches for a new base station device 12. In other words, the terminal device 10 attempts to receive a control signal, changing the frequency channel. The process temporarily places the terminal device 10 in a state where communication is disabled. However, point P1 of FIG. 1 is not outside the first wide communication area 14a or the first narrow communication area 16a. Therefore, it may sometimes be better to wait until the intensity of the control signal received from the first base station device 12a grows higher instead of searching for a new base station device 12.

In this sense, the controller 26 of the second terminal device 10b according to the embodiment uses the base station information received in the second communication interface 30 to exercise control. The controller 26 acquires the base station ID included in the base station information. The base station ID is the base station ID of the first base station device 12a that the first terminal device 10a of FIG. 1 is communicating with. Meanwhile, the controller 26 also acquires the base station ID of the first base station device 12a that the first communication interface 28 is communicating with. The controller 26 compares these base station IDs. Since the base station IDs are identical (hereinafter, referred to as "state of identity"), the controller 26 causes the first communication interface 28 to maintain communication with the first base station device 12a that the first communication interface 28 is communicating with. In other words, the controller 26 does not allow the first communication interface 28 to search for a new base station device 12. Thus, when the controller 26 recognizes that the first terminal device 10a located in the vicinity is communicating with the first base station device 12a, the controller 26 estimates that the second terminal device 10b is also located at a position where communication with the first base station device 12a is enabled.

It will now be assumed that the second terminal device 10b is located at point P2 of FIG. 1 when the intensity received is equal to or lower than the threshold value. Since point P2 is located within the third narrow communication area 16c, the second communication interface 30 of the second terminal device 10b receives the base station information from the third terminal device 10c. Therefore, the controller 26 acquires the base station ID included in the base station information, which is the base station ID of the second base station device 12b that the third terminal device 10c is communicating with. As described above, the controller 26 also acquires the base station ID of the first base station device 12a that the first communication interface 28 is communicating with. The controller 26 compares these base station IDs. Since the base station IDs are different (hereinafter, referred to as "state of difference"), the controller 26 causes the first communication interface 28 to search for a base station device 12 different from the first base station device 12a that the first communication interface 28 is communicating with. Thus, when the controller 26 recognizes that the third terminal device 10c located in the vicinity is not communicating with the first base station device 12a, the controller 26 estimates that the second terminal device 10b is also located at a position where communication with the first base station device 12a is disabled. This may prompt the first communication interface 28 to roam to the base station device 12 having the base station ID included in the base station information. In this way, the controller 26 determines whether to search for a new base station device 12 based on the base station information. This can be said to be a selection of the base station device 12 that the first communication interface 28 should communicate with.

(3) The Second Process in the Search for the Base Station Device 12

In the second process in the search for the base station device 12, as in the first process, the controller 26 of the second terminal device 10b causes, in the state of difference, the first communication interface 28 to search for the base station device 12 different from the first base station device 12a that the first communication interface 28 is communicating with. On the other hand, a process different from the first process is performed in the second process in the search for the base station device 12 in the state of identity.

As described above, the base station information received in the second communication interface 30 includes the information on the intensity of the control signal received from the base station device 12 that the further terminal device 10 is communicating with. Even in the state of identify, the controller 26 causes the first communication interface 28 to search for the base station device 12 different from the first base station device 12a that the first communication interface 28 is communicating with, when the intensity of a received signal included in the base station information is equal to or lower than a further threshold value. Meanwhile, when the intensity of a received signal included in the base station information is higher than the further threshold value in the state of identity, the controller 26 causes the first communication interface 28 to maintain communication with the first base station device 12a that the first communication interface 28 is communicating with. Thus, when the first terminal device 10a located in the vicinity is communicating with the first base station device 12a but the intensity of the control signal received in the first terminal device 10a is low, the controller 26 estimates that the second terminal device 10b is located at a position where communication with the first base station device 12a is disabled.

(4) The Third Process in the Search for the Base Station Device 12

In the third process in the search for the base station device 12, as in the first process, the controller 26 of the second terminal device 10b causes, in the state of difference, the first communication interface 28 to search for the base station device 12 different from the first base station device 12a that the first communication interface 28 is communicating with. On the other hand, a process different from the first process is performed in the third process in the search for the base station device 12 in the state of identity.

The second communication interface 30 measures the intensity of the received base station information. The second communication interface 30 outputs the information on the intensity of the received base station information to the controller 26. Even in the state of identify, the controller 26 causes the first communication interface 28 to search for the base station device 12 different from the first base station device 12a that the first communication interface 28 is communicating with, when the intensity of the received base station information measured in the second communication interface 30 is equal to or lower than the further threshold value. Meanwhile, when the intensity of the received base station information measured in the second communication interface 30 is higher than the further threshold value in the state of identity, the controller 26 causes the first communication interface 28 to maintain communication with the first base station device 12a that the first communication interface 28 is communicating with.

It can generally be said that the further terminal device 10 originating the base station information and the second terminal device 10b are at a small distance when the intensity of the received base station information is high. In such a situation, the base station information from the further terminal device 10 can be relied upon by the second terminal device 10b. Therefore, the reliability of the state of identity is increased. When the intensity of the received base station information is low, on the other hand, it can be said that the further terminal device 10 originating the base station information and the second terminal device 10b are at a large distance. In such a situation, the base station information from the further terminal device 10 cannot be relied upon by the second terminal device 10b. Therefore, the reliability of the state of identity is decreased.

The features are implemented in hardware such as a CPU, a memory, or other LSI's, of any computer and in software such as a program loaded into a memory. The figure depicts functional blocks implemented by the cooperation of these elements. Therefore, it will be understood by those skilled in the art that the functional blocks may be implemented in a variety of manners by hardware only or by a combination of hardware and software.

Figure 4:
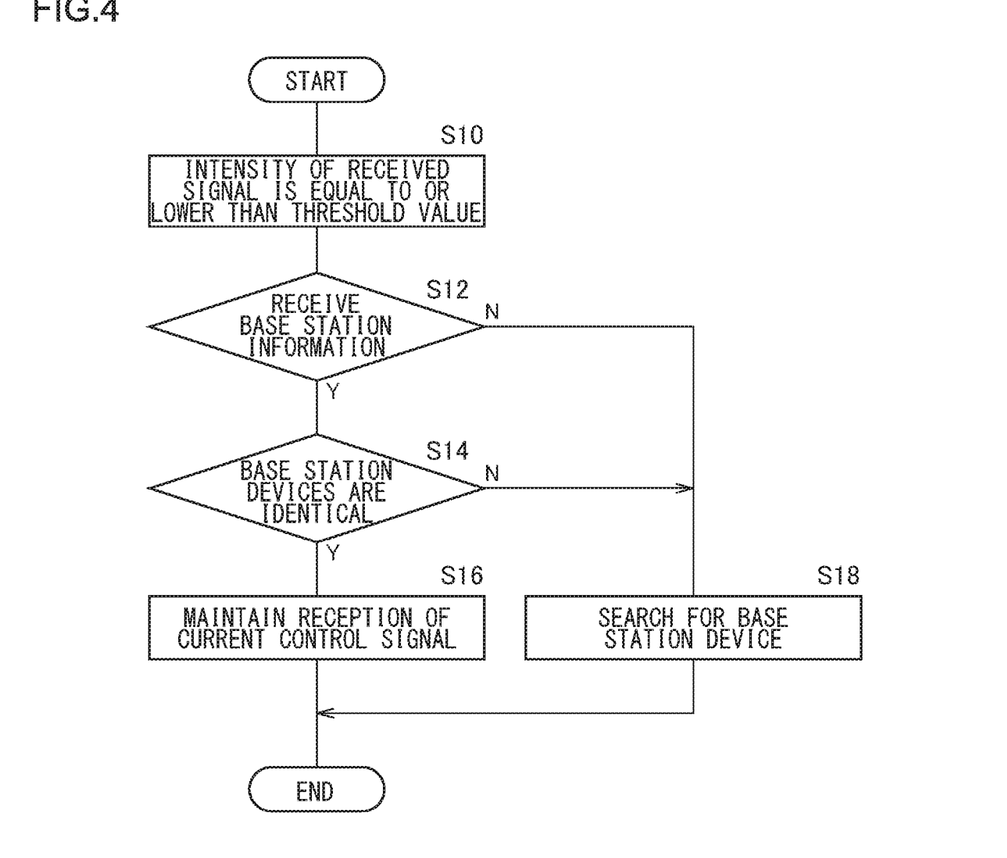
FIG. 4 is a flowchart showing steps of a search performed by the terminal device of FIG. 2.

A description will now be given of the operation of the communication system 100 having the configuration described above. FIG. 4 is a flowchart showing steps of a search performed by the terminal device 10. The figure depicts the first process. The intensity of the control signal received in the first communication interface 28 drops below a threshold value (S10). When the second communication interface 30 is receiving the base station information (Y in S12) and the base station device 12 that the first communication interface 28 is communicating with and the base station device 12 indicated by the base station information are identical (Y in S14), the controller 26 determines to maintain the reception of the current control signal (S16). This is equivalent to maintaining the frequency channel. When the second communication interface 30 is not receiving the base station information (N in S12), or when the base station device 12 that the first communication interface 28 is communicating with and the base station device 12 indicated by the base station information are not identical (N in S14), the controller 26 determines to search for a new base station device 12 (S18).

Figure 5:
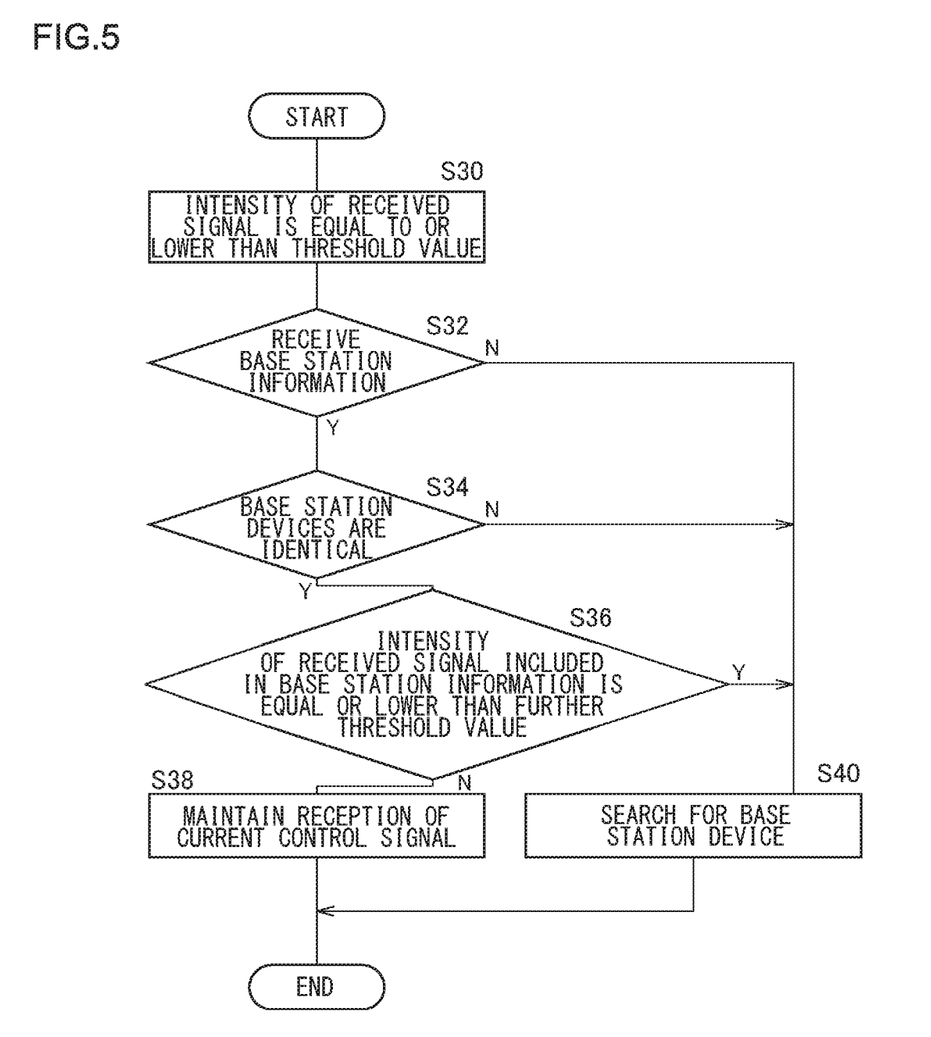
FIG. 5 is a flowchart showing steps of another search performed by the terminal device of FIG. 2.

FIG. 5 is a flowchart showing steps of another search performed by the terminal device 10. The figure depicts the second process. The intensity of the control signal received in the first communication interface 28 drops below a threshold value (S30). When the second communication interface 30 is receiving the base station information (Y in S32), when the base station device 12 that the first communication interface 28 is communicating with and the base station device 12 indicated by the base station information are identical (Y in S34), and when the intensity of a received signal included in the base station information is not equal to lower than the further threshold value (N in S36), the controller 26 determines to maintain the reception of the current control signal (S38). When the second communication interface 30 is not receiving the base station information (N in S32), or when the base station device 12 that the first communication interface 28 is communicating with and the base station device 12 indicated by the base station information are not identical (N in S34), or when the intensity of a received signal included in the base station information is equal to or lower than the further threshold value (Y in S36), the controller 26 determines to search for a new base station device 12 (S40).

Figure 6:
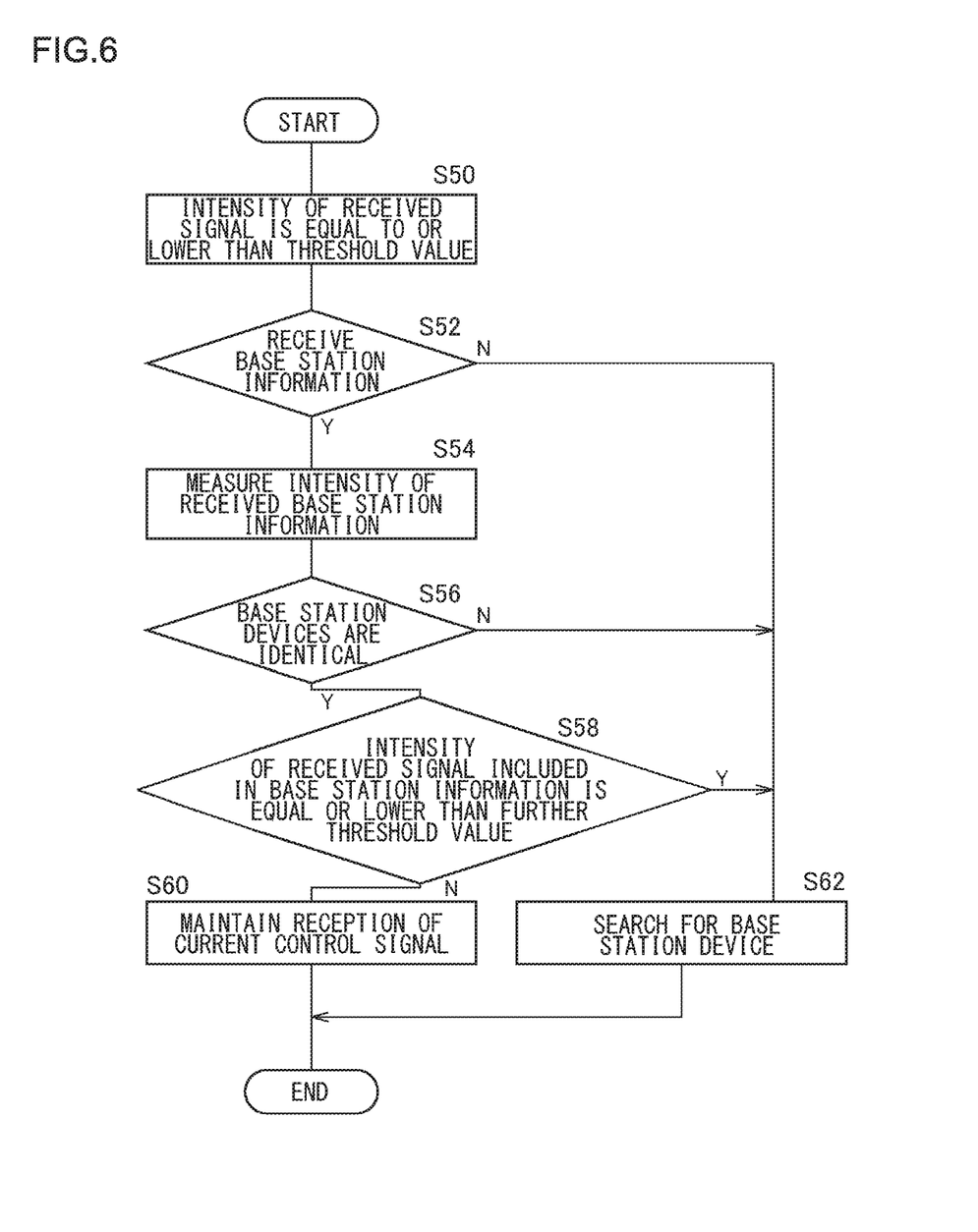
FIG. 6 is a flowchart showing steps of still another search performed by the terminal device of FIG. 2.

FIG. 6 is a flowchart showing steps of still another search performed by the terminal device 10. The figure depicts the third process. The intensity of the control signal received in the first communication interface 28 drops below a threshold value (S50). When the second communication interface 30 is receiving the base station information (Y in S52), the second communication interface 30 measures the intensity of the received base station information (S54). When the base station device 12 that the first communication interface 28 is communicating with and the base station device 12 indicated by the base station information are identical (Y in S56) and the intensity of the received base station information is not equal to lower than the further threshold value (N in S58), the controller 26 determines to maintain the reception of the current control signal (S60). When the second communication interface 30 is not receiving the base station information (N in S52), or when the base station device 12 that the first communication interface 28 is communicating with and the base station device 12 indicated by the base station information are not identical (N in S56), or when the intensity of the received base station information is equal to or lower than the further threshold value (Y in S58), the controller 26 determines to search for a new base station device 12 (S62).

According to the embodiment, the base station device that the terminal device should communicate with according to the first communication scheme is selected based on the base station information received from the further terminal device according to the second communication scheme and related to the base station device that the further terminal device is communicating with. Therefore, the base station device that the terminal device is currently communicating with can be selected depending on the situation. Since the base station device that the terminal device is currently communicating with can be selected depending on the situation, an unnecessary search for a base station device is inhibited. Since an unnecessary search for a base station device is inhibited, the period of time of disabled communication is reduced. Since the period of time of disabled communication is reduced, communication is stabilized. Further, since selection of a base station device is performed based on the received base station information when the intensity of the control signal received from the base station device is equal to or lower than a threshold value, a selection of the base station device can be made when the condition of reception of the control signal becomes poor.

When the base station device that the terminal device is communicating with and the base station device indicated by the base station information are different, a search is conducted for a base station device different from the base station device that the terminal device is communicating with. Therefore, connection can be made to a new base station device. Further, communication with the base station device that the terminal device is communicating with is maintained when the base station device that the terminal device is communicating with and the base station device indicated by the base station information are identical. Therefore, an unnecessary search for a base station device is inhibited. Further, a determination as to whether the terminal device is inside a coverage or outside a coverage is made by using proximity communication to additionally consider the condition of reception in the further terminal device around. Therefore, an unnecessary search for a control signal is inhibited. Not only the intensity of a received signal but also the base station information from the further terminal device located in the vicinity are referred to in determining whether to perform a search. Therefore, the precision of a determination on whether the terminal device is inside the coverage area of the currently used base station device is improved. Since the precision of a determination on whether the terminal device is inside the coverage area of the currently used base station device is improved, an unnecessary search is prevented from being performed when the terminal device moves to an environment of poor reception inside the coverage.

Even if the base station device that the terminal device is communicating with and the base station device indicated by the base station information are identical, a search is conducted for a base station device different from the base station device that the terminal device is communicating with, when the intensity of a received signal included in the base station information is equal to lower than the further threshold value. Accordingly, the condition of communication is improved. Even if the base station device that the terminal device is communicating with and the base station device indicated by the base station information are identical, a search is conducted for a base station device different from the base station device that the terminal device is communicating with, when the intensity of a received signal included in the base station information is equal to lower than the further threshold value. Accordingly, less reliable base station information can be left unconsidered.

Embodiment 2

A description will now be given of embodiment 2. Like embodiment 1, embodiment 2 relates to a communication system in which a terminal device is connected to one of a plurality of base station devices. As in embodiment 1, the terminal device according to embodiment 2 uses the base station information received from a further terminal device to select a base station device that the terminal device should communicate with. In embodiment 1, the base station information is received from one further terminal device. In embodiment 2, on the other hand, the base station information is received from a plurality of further terminal devices. The communication system 100 and the terminal device 10 according to embodiment 2 are of the same type as those of FIGS. 1 and 2. The description below highlights a difference from embodiment 1.

The controller 26 of the second terminal device 10b in embodiment 1 uses the base station information received in the second communication interface 30 to exercise control when the intensity of a signal received from the first communication interface 28 is equal to lower than a threshold value. The controller 26 of the second terminal device 10b in embodiment 2 may use, as in embodiment 1, the base station information received in the second communication interface 30 to exercise control when the intensity of a signal received from the first communication interface 28 is equal to lower than a threshold value. Hereinafter, this state will be referred to as "first state". Further, the controller 26 of the second terminal device 10b in embodiment 2 may use the base station information received in the second communication interface 30 to exercise control when the second terminal device 10b is started. Hereinafter, this state will be referred to as "second state". In other words, the base station information may be used to search for a control signal immediately after the terminal device 10 is started.

Figure 7:
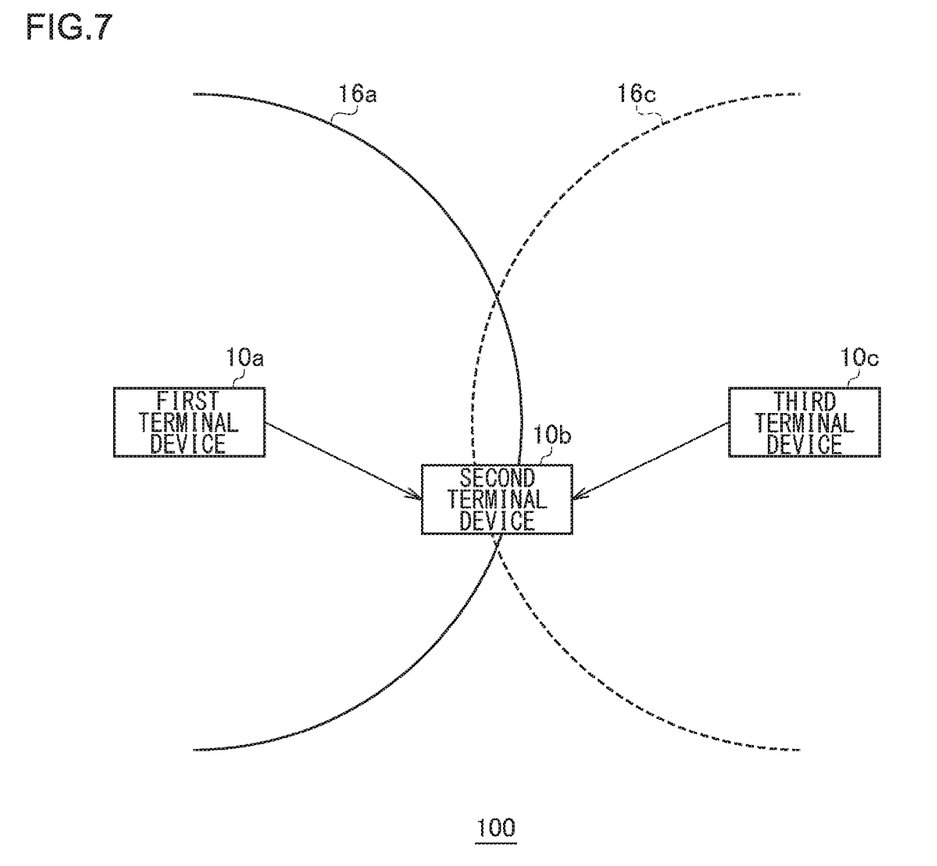
FIG. 7 shows a configuration of the communication system according to embodiment 2.

FIG. 7 shows a configuration of the communication system 100. As in the configuration described above, the first terminal device 10a is connected to the first base station device 12a, and the third terminal device 10c is connected to the second base station device 12b. Further, the first terminal device 10a forms the first narrow communication area 16a, and the third terminal device 10c forms the third narrow communication area 16c. A part of the first narrow communication area 16a and a part of the third narrow communication area 16c overlap. The second terminal device 10b is located in an area of overlapping. For this reason, the second communication interface 30 of the second terminal device 10b receives the base station information from the first terminal device 10a and also receives the base station information from the third terminal device 10c. The second communication interface 30 also measures the intensity of each received base station information.

The controller 26 selects one piece of base station information based on the intensity of each received base station information measured in the second communication interface 30. For example, the controller 26 selects the base station information measured to have the highest intensity. In the first state, the controller 26 determines whether to search for a new base station device 12 based on the selected base station information. The process is similar to that of embodiment 1. Meanwhile, the controller 26 in the second state selects the base station device 12 based on the selected base station information. For example, the controller 26 causes the first communication interface 28 to set the frequency channel indicated by the CH information included in the base station information and causes the first communication interface 28 to receive the control signal from the base station device 12 having the base station ID included in the base station information.

Figure 8:
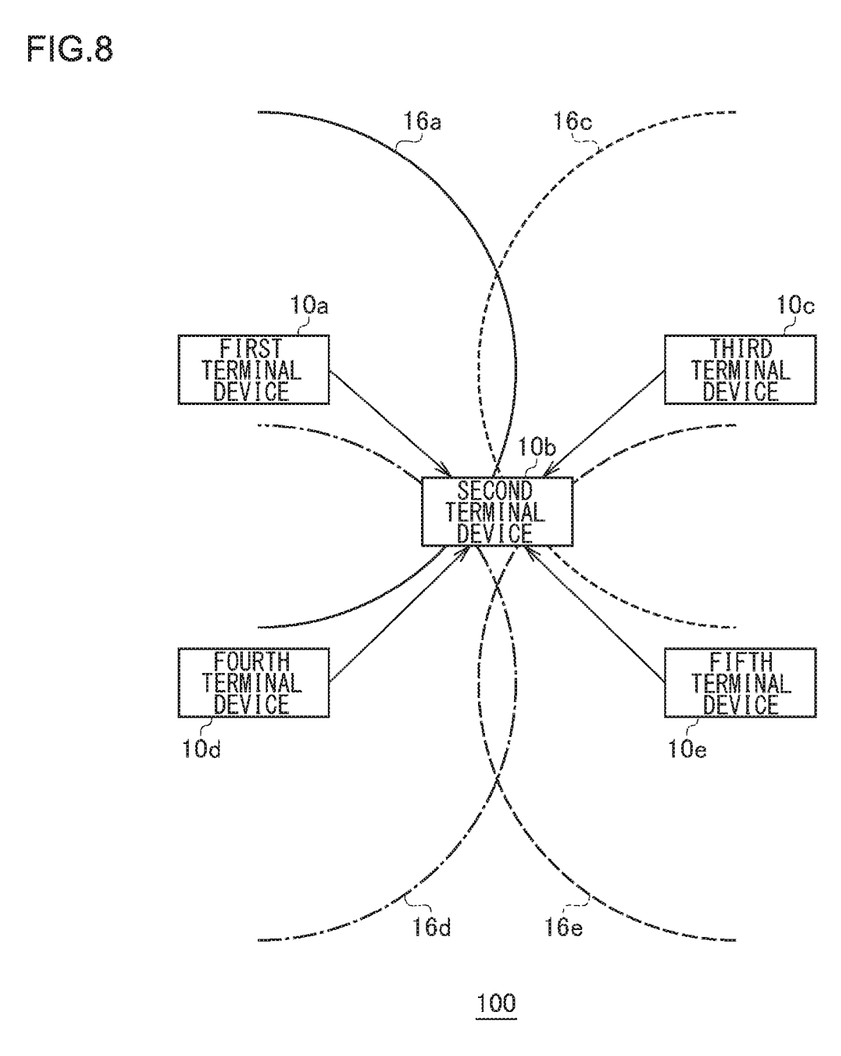
FIG. 8 shows another configuration of the communication system according to embodiment 2.

FIG. 8 shows another configuration of the communication system 100. As in FIG. 7, the first terminal device 10a forms the first narrow communication area 16a, and the third terminal device 10c forms the third narrow communication area 16c. Further, a fourth terminal device 10d forms a fourth narrow communication area 16d, and a fifth terminal device 10e forms a fifth narrow communication area 16e. The fourth terminal device 10d and the fifth terminal device 10e are also connected to one of base station devices 12. Parts of the first narrow communication area 16a, the third narrow communication area 16c, the fourth narrow communication area 16d, and the fifth narrow communication area 16e overlap. The second terminal device 10b is located in an area of overlapping. For this reason, the second communication interface 30 of the second terminal device 10b receives the base station information from each of the first terminal device 10a, the third terminal device 10c, the fourth terminal device 10d, and the fifth terminal device 10e. The second communication interface 30 also measures the intensity of each received base station information.

Figure 9A:
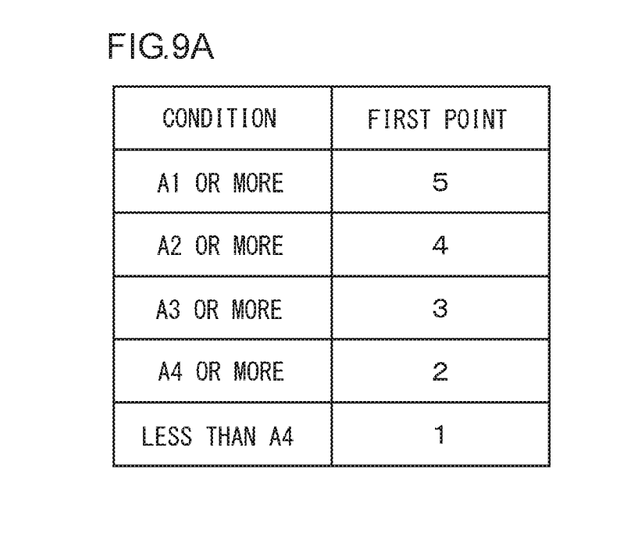
FIGS. 9A-9B show a data structure of a table stored in the controller according to embodiment 2.
Figure 9B:
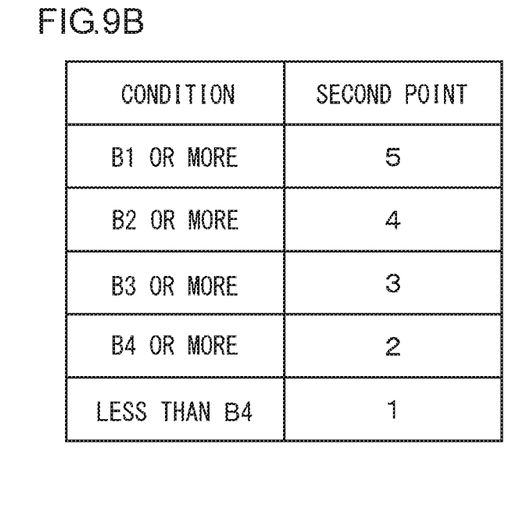

The controller 26 receives the intensity of each received base station information measured in the second communication interface 30. The controller 26 converts the intensity of each received base station information into a point (hereinafter, referred to as "first point"). For the purpose of this conversion, the controller 26 stores a table. FIGS. 9A-9B show a data structure of a table stored in the controller 26. FIG. 9A shows a table for converting the intensity of the received base station information into the first point. "A1", "A2", "A3", and "A4" (A1>A2>A3>A4) are defined as a plurality of threshold values. The controller 26 extracts, for each base station information, the first point for which the intensity of the received base station information meets the listed condition. The higher the intensity of the received base station information, the larger the first point. FIG. 9B will be described later, and reference is made back to FIG. 2.

The controller 26 extracts the base station ID and the intensity of the received control signal from the base station information. The controller 26 converts the intensity of the received control signal included in each base station information into a point (hereinafter, referred to as "second point"). FIG. 9B shows a table for converting the intensity of the received control signal into the second point. "B1", "B2", "B3", and "B4" (B1>B2>B3>B4) are defined as a plurality of threshold values. The controller 26 extracts, for each base station information, the second point for which the intensity of the received control signal meets the listed condition. The higher the intensity of the received control signal, the larger the second point. Reference is made back to FIG. 2.

The controller 26 maps one base station information item to the first point and the second point and also maps the base station ID included in the one base station information item to the first point and the second point. Further, the controller 26 derives a point for the one base station information item by adding the first point and the second point. The controller 26 may derive a point for the the one base station information item by multiplying the first point by the second point. By performing a similar process for each base station information, the controller 26 derives a combination of the base station ID and the point for each base station information. The controller 26 also derives an average value of the points for each base station ID. The controller 26 selects the base station device 12 with the base station ID having the maximum average value as a target of connection. In other words, the controller 26 selects the base station device 12 based on the combination of the intensity of the received base station information and the intensity of the received control signal.

According to the embodiment, the base station device is selected based on the received base station information when the terminal device is started so that the speed of connection is increased. Since one of the base station information items is selected based on the intensity of each received base station information when the base station information is received from each of the plurality of further terminal devices, the precision of selection of the base station information is improved. Further, when the base station information is received from each of the plurality of further terminal devices, the base station device is selected based on the combination of the intensity of each received base station information and the intensity of a received signal included in each base station information. Accordingly, the precision of selecting a base station device is improved.

Described above is an explanation based on an exemplary embodiment. The embodiment is intended to be illustrative only and it will be understood by those skilled in the art that various modifications to constituting elements and processes could be developed and that such modifications are also within the scope of the present invention.

According to the embodiments, a business wireless system is used as the communication system 100. Alternatively, a wireless communication system other than the business wireless system, such as a cellular phone system, may be used. According to this variation, the flexibility of the system is improved.

What is claimed is:

1. A terminal device comprising:
a first communication interface that communicates with a base station device of a plurality of base station devices according to a first communication scheme and measures a first signal level that is an intensity of a signal received from the base station device;
a second communication interface that transmits base station information to a further terminal devices located in a vicinity and receives base station information from the further terminal device according to a second communication scheme different from the first communication scheme, and measures a second signal level that is an intensity of a signal received from the further terminal device located in the vicinity; and
a controller that selects a base station device that the first communication interface should communicate with based on the base station information received in the second communication interface from the further terminal device and related to the base station device that the further terminal device is communicating with.

2. The terminal device according to claim 1, wherein
the controller selects a base station device based on the base station information received in the second communication interface when an intensity of the first signal level is equal to or lower than a threshold value.

3. The terminal device according to claim 2, wherein
the base station information received in the second communication interface includes information on the first signal level received from the base station device that the further terminal device is communicating with,
when the base station device that the first communication interface is communicating with is identical to the base station device indicated by the base station information received in the second communication interface, the controller causes the first communication interface to maintain communication with the base station device that the first communication interface is communicating with, and, when the first signal level is equal to or lower than a further threshold value, the controller selects a base station device to connect to by causing the first communication interface to search for a base station device different from the base station device that the first communication interface is communicating with.

4. The terminal device according to claim 3, wherein
the controller selects base station information based on the second signal level measured in the second communication interface and selects a base station device corresponding to the selected base station information.

5. The terminal device according to claim 2, wherein
when the base station device that the first communication interface is communicating with is identical to the base station device indicated by the base station information received in the second communication interface, the controller causes the first communication interface to maintain communication with the base station device that the first communication interface is communicating with, and, when the second signal level measured in the second communication interface is equal to lower than a further threshold value, the controller selects a base station device to connect to by causing the first communication interface to search for a base station device different from the base station device that the first communication interface is communicating with.

6. The terminal device according to claim 5, wherein the controller selects base station information based on the second signal level measured in the second communication interface and selects a base station device corresponding to the selected base station information.

7. The terminal device according to claim 1, wherein the controller selects a base station device based on the base station information received in the second communication interface, when the terminal device is started.

8. The terminal device according to claim 7, wherein the controller selects base station information based on the second signal level measured in the second communication interface and selects a base station device corresponding to the selected base station information.

9. A communication method comprising:

communicating with a base station device of a plurality of base station devices according to a first communication scheme and measuring a first signal level that is an intensity of a signal received from the base station device;

transmitting base station information to a further terminal devices located in a vicinity and receiving base station information from the further terminal device according to a second communication scheme different from the first communication scheme, and measuring a second signal level that is an intensity of a signal received from the further terminal device located in the vicinity; and selecting a base station device to communicate with according to the first communication scheme, based on the base station information received from the further terminal device according to the second communication scheme and related to the base station device that the further terminal device is communicating with.

10. A recording medium encoded with a program, the program comprising computer-implemented modules including:

communicating with a base station device of a plurality of base station devices according to a first communication scheme and measuring a first signal level that is an intensity of a signal received from the base station device;

transmitting base station information to a further terminal devices located in a vicinity and receiving base station information from the further terminal device according to a second communication scheme different from the first communication scheme, and measuring a second signal level that is an intensity of a signal received from the further terminal device located in the vicinity; and selecting a base station device to communicate with according to the first communication scheme, based on the base station information received from the further terminal device according to the second communication scheme and related to the base station device that the further terminal device is communicating with.

* * * * *